(12) United States Patent
Frait

(10) Patent No.: US 8,182,238 B2
(45) Date of Patent: May 22, 2012

(54) VARIABLE DISPLACEMENT TRANSMISSION PUMP CONTROL

(75) Inventor: Steve A. Frait, Milan, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 440 days.

(21) Appl. No.: 12/417,759

(22) Filed: Apr. 3, 2009

(65) Prior Publication Data

US 2010/0254828 A1  Oct. 7, 2010

(51) Int. Cl.
    *F04B 49/00* (2006.01)
(52) U.S. Cl. .......................... 417/220; 418/30
(58) Field of Classification Search ............ 417/53, 417/217, 220; 418/30, 31
    See application file for complete search history.

(56) References Cited

U.S. PATENT DOCUMENTS

| 4,244,678 A | 1/1981 | Uehara et al. |
| 4,598,612 A | 7/1986 | Ideta |
| 5,305,663 A | 4/1994 | Leonard et al. |
| 5,579,244 A * | 11/1996 | Brown .......................... 700/301 |
| 5,738,602 A | 4/1998 | Morita et al. |
| 6,110,072 A | 8/2000 | Harada et al. |
| 6,135,919 A | 10/2000 | Shimakura |
| 6,319,164 B1 | 11/2001 | Runde et al. |
| 6,692,402 B2 | 2/2004 | Nakamori et al. |
| 6,769,502 B2 | 8/2004 | Nakamori et al. |
| 6,840,889 B2 | 1/2005 | Aoki et al. |
| 7,194,349 B2 | 3/2007 | Surianarayanan et al. |
| 7,261,662 B2 | 8/2007 | Nozaki et al. |
| 7,351,175 B2 | 4/2008 | Kraxner et al. |
| 2001/0009881 A1 | 7/2001 | Albs et al. |
| 2003/0231965 A1 * | 12/2003 | Hunter et al. .................. 417/212 |
| 2007/0066435 A1 | 3/2007 | Takagi et al. |

* cited by examiner

*Primary Examiner* — Anh Mai
*Assistant Examiner* — Andrew Coughlin
(74) *Attorney, Agent, or Firm* — David B. Kelley; MacMillan, Sobanski & Todd, LLC

(57) ABSTRACT

A system for controlling fluid flow rates in a transmission includes a pump having variable displacement and providing a pressurized fluid source, a regulating valve communicating with the fluid source and a pressure sensor, the pressure sensor producing a variable control signal whose magnitude represents a degree to which fluid flow requirements of the transmission are being provided by the fluid source, and an actuating valve producing a pressure that changes the pump displacement in response to the magnitude of the control pressure.

18 Claims, 1 Drawing Sheet

VARIABLE DISPLACEMENT TRANSMISSION PUMP CONTROL

BACKGROUND OF THE INVENTION

1. Field of the Invention

This invention relates generally to an electro-hydraulic control of an automatic transmission, particularly to a control system having active control of pump displacement.

2. Description of the Prior Art

Most current automatic transmissions use a solenoid in conjunction with a regulator & latch valve to control independently the clutches and brakes, which are applied and released to produce the transmission gear ratios. A valve body assembly that includes a solenoid with a regulator & latch valve for this purpose requires many layers to accommodate all of the solenoids and valves. Such a valve body adds cost and size due to the many valve body layers, and it creates hydraulic response time delays due to the multiple stages from solenoid output to regulator valve input to regulator output, which must be controlled. Further, these delays are temperature sensitive.

Conventional automatic transmissions use bleed flows to improve the hydraulic controls performance and repeatability, but these flows result in lost hydraulic power, which power loss is detrimental to fuel economy.

Variable displacement pump controls are indirectly controlled, which can introduce system instability and deliver a fluid flow rate that is much higher than needed by the transmission, further reducing fuel economy.

Most transmissions use a one-way-clutch to produce a synchronous upshift between first gear and second gear. A conventional one-way-clutch is costly and creates internal drag in the transmission.

A need exists in the industry for an electro-hydraulic control that permits a reduction is size of the valve body, reduces the number of valves, improves vehicle fuel economy and shortens the time required to execute gear shifts.

SUMMARY OF THE INVENTION

A system for controlling fluid flow rates in a transmission includes a pump having variable displacement and providing a pressurized fluid source, a regulating valve communicating with the fluid source and a pressure sensor, the pressure sensor producing a variable control signal whose magnitude represents a degree to which fluid flow requirements of the transmission are being provided by the fluid source, and an actuating valve producing a pressure that changes the pump displacement in response to the magnitude of the control pressure.

The invention further contemplates a method for controlling a variable displacement transmission pump. A variable control signal is produced that represents a degree to which fluid flow requirements of the transmission are being met by the pump. A control pressure is produced in response to the control signal. The displacement of the pump is changed in response to the control pressure.

The variable displacement pump is closed-loop controlled by incorporating a pressure sensor on a dedicated circuit from the main regulator. This arrangement decouples the flow control, i.e., pump displacement, from the variable pressure control, allowing optimized flow delivery, thereby improving the hydraulic efficiency of the transmission. The control eliminates need for a large bleed circuit to stabilize the pump.

Decreasing the pump flow by reducing the bleed circuit losses and improving the control of the pump increases the fuel economy of a vehicle powertrain that includes a transmission having the control system.

The variable displacement pump affects fuel economy by about two percent. The electro-hydraulic control potentially reduces the pumping flow by approximately 25 percent, which corresponds to a fuel economy improvement of about 0.5 percent.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which:

FIG. 2 is a graph showing the relation between line pressure and pressure at the pressure sensor.

DESCRIPTION OF THE PREFERRED EMBODIMENT

Figure 1:
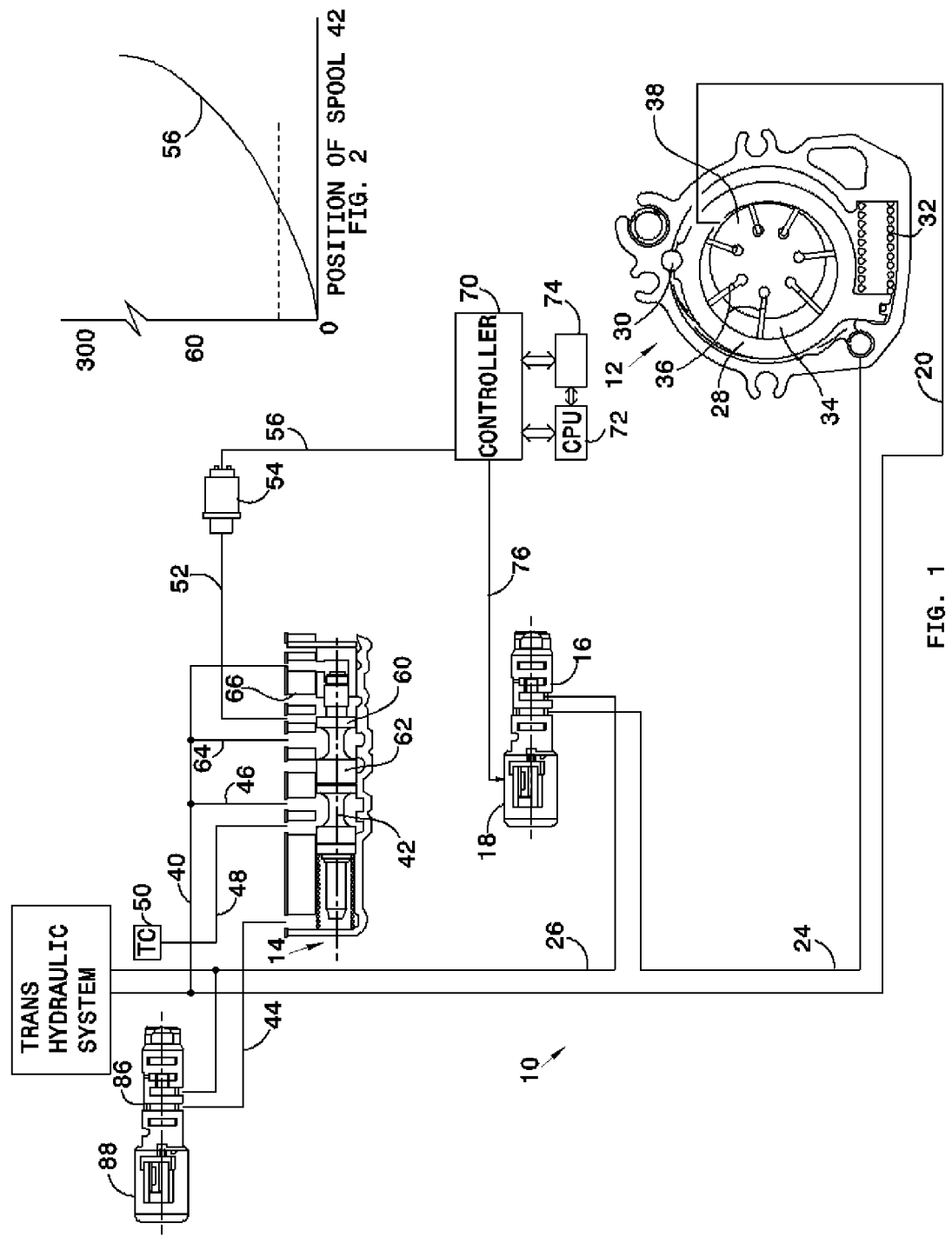
FIG. 1 is a schematic diagram of a hydraulic circuit and control system for an automatic transmission showing a portion of the circuit related to control of the pump displacement.

Referring now to the drawings, there is illustrated in FIG. 1 a hydraulic circuit 10 for an automatic transmission, which includes a variable displacement hydraulic vane pump 12, a main regulator valve 14, and a pump displacement control valve 16, controlled by a variable force solenoid 18.

Hydraulic fluid exiting pump 12 is carried in line 20 to supply hydraulic fluid for the transmission. Line 24 carries pump displacement control pressure from valve 16 to pump 12. Solenoid feed pressure is carried in line 26 to valve 16 and 86. When pressure in line 24 is high, the pump control ring 28 pivots counterclockwise about point 30 in opposition to the force of a compression spring 32. This pivoting reduces the volume 34 through which the vanes 36 on the pump rotor 38 rotate, i.e., the pump displacement, and the flow rate of fluid exiting the pump 12. When pressure in line 24 is low, the pump control ring 28 pivots clockwise, increasing the pump displacement and the flow rate of fluid exiting the pump 12.

Line pressure is carried in line 40 to the right-hand end of the spool 42 of main regulator valve 14. Pressure from a line pressure control solenoid, carried in line 44 to the left-hand side of spool 42, and the force of a compression spring 46 oppose the force produced by line pressure on spool 42.

FIG. 1 shows spool 42 biased leftward by the resultant of these forces on the spool toward a saturated position at the extreme left-hand end of the valve 14 where the flow requirements of various subsystems are being fully met by the pump 12 at its current speed and displacement, thereby representing potential to decrease pump displacement. Movement of spool 42 rightward toward the right-hand end of the valve 14 indicates that fluid flow demand is not being met at the current pump speed and displacement and requires an increase in pump displacement. Valve 14 controls the subsystem flow requirements in the following priority: 1) line pressure, 2) torque converter feed, and 3) exhaust pressure.

Valve 14 can alternately connect and disconnect communication between line 46 and line 48, which feeds transmission fluid to a torque converter 50. Valve 14 can alternately connect and disconnect communication between line pressure in line 40 and line 52, which communicates with a pressure pressure sensor 54, such as a pressure transducer or pressure switch.

Pressure sensor 54 produces an electronic signal 56 representing the magnitude of pressure in hydraulic line 52. FIG. 2 is a graph showing the relation between pressure sensor pressure (0-300 psi.), i.e., signal 56, and the position of spool 42 in valve 14.

When spool 42 is at or near the left-hand end of valve 14, lands 60, 62 close line 64 and land 60 opens a connection between line 52 and a vent port 66, producing a pressure sensor pressure that is substantially zero. As spool 42 moves rightward from the position of FIG. 1, land 60 partially opens a connection between line 64 and pressure sensor line 52, and it partially closes the connection between pressure sensor line 52 and vent port 66, causing an increase in pressure sensor pressure. When pressure sensor pressure in line 52 reaches about 20 psi., vent port 62 is fully closed.

Thereafter, as spool 42 and land 60 move further rightward, pressure sensor pressure increases rapidly as the connection between line 64 and line 52 opens more fully, until it is fully opened at a pressure sensor pressure equal to commanded line pressure resulting from valve 16. Pressure sensor signal 56 represents the magnitude of these pressure changes at pressure sensor 54.

FIG. 1 illustrates an electronic controller 70, which includes an a central processing unit CPU 72 and electronic memory 74 containing control algorithms stored there in coded form readable by the CPU. The pressure sensor signal 56 is received by the controller 70 as input, and the pressure magnitude it represents is used during execution of the algorithms to produce a variable output control signal 76 supplied to the variable force solenoid 18. The displacement control valve 16 uses solenoid feed pressure in line 26 and actuation of solenoid 18 by the electric current signal 76 to regulate the magnitude of pump displacement pressure carried in line 24 to the pump 12. Pump displacement is increased and decreased in response to the magnitude of the signal 56 produced by pressure sensor 54.

In accordance with the provisions of the patent statutes, the preferred embodiment has been described. However, it should be noted that the alternate embodiments can be practiced otherwise than as specifically illustrated and described.

The invention claimed is:

1. A method for controlling a pump, comprising:
   (a) using a valve spool responsive to line pressure for throttling fluid from line pressure to a vent and a pressure sensor producing a control signal representing pressure in said sensor;
   (b) producing an electric current in response to said control signal;
   (c) applying said current to a solenoid-operated second valve, whose output pressure changes displacement of the pump.

2. The method of claim 1 wherein step (a) further comprises:
   providing a regulator valve, the position of whose spool opens and closes variable fluid connections among the line pressure, the pressure sensor and the vent port.

3. The method of claim 2 wherein the line pressure is a source of transmission line pressure.

4. The method of claim 1 wherein step (b) further comprises:
   converting the control signal to PWM voltage;
   applying the voltage to a PWM variable force solenoid; and
   using the solenoid to actuate the solenoid-operated second valve.

5. The method of claim 1 wherein step (b) further comprises:
   converting the control signal to a variable electric current;
   applying the current to a variable force solenoid;
   using the solenoid to actuate a the solenoid-operated second valve.

6. The method of claim 5 wherein the solenoid-operated second valve uses solenoid feed pressure and the solenoid to change displacement of the pump.

7. A method for controlling a pump, comprising the steps of:
   (a) using a valve to control line pressure;
   (b) using a second valve responsive to line pressure for throttling fluid from line pressure to a vent and a pressure sensor producing a control signal representing pressure in said sensor;
   (c) producing an electric current in response to said control signal;
   (d) applying said current to a solenoid-operated valve, whose output pressure changes displacement of the pump.

8. The method of claim 7 wherein step (b) further comprises:
   providing a spool of the second valve moveable in a chamber in response to a force produced by a line pressure, the position of the spool in the chamber tending to open and close fluid connections between line pressure, the pressure sensor and the vent port.

9. The method of claim 7 wherein step (a) further comprises:
   providing a valve that opens and closes variable fluid connections among the pressure source, the pressure sensor and the vent port.

10. The method of claim 9 wherein the line pressure is a source of transmission line pressure.

11. The method of claim 7 wherein step (c) further comprises:
    converting the control signal to a variable electric current;
    applying the current to a variable force solenoid;
    using the solenoid to actuate the solenoid-operated valve.

12. The method of claim 7 wherein step (c) further comprises:
    converting control signal to PWM voltage;
    applying the voltage to a PWM variable force solenoid;
    using the solenoid to actuate the solenoid-operated valve.

13. A system for controlling fluid flow in a pump, comprising:
    a line pressure control valve;
    a valve responsive to line pressure for throttling fluid from a line pressure port to a vent port and a pressure sensor producing a control signal representing pressure at said sensor;
    a controller producing an electric current in response to said control signal;
    a solenoid-operated valve responsive to the current, producing an output pressure that changes displacement of the pump.

14. The system of claim 13, wherein the valve includes a spool that changes the magnitude of the control signal by opening and closing fluid connections among the fluid pressure source, the pressure sensor and the vent port.

15. The system of claim 13, wherein the valve includes:
    a chamber communicating with line pressure, a spring, the pressure sensor, and the vent port;
    a spool moveable in the chamber in response to a sum of forces produced by line pressure and the spring, the position of the spool in the chamber tending to open and close fluid connections between line pressure, the pressure sensor and the vent port.

16. The system of claim 13, wherein the pressure sensor is a pressure transducer.

17. The system of claim 13 wherein the solenoid-operated valve communicates with a source of solenoid feed pressure and is actuated by a solenoid.

18. The system of claim 13 further comprising;
    a solenoid for actuating the solenoid-operated valve;
    the controller being configured to apply the electric current to the solenoid.

* * * * *